United States Patent [19]

van Raay

[11] 4,143,593
[45] Mar. 13, 1979

[54] PEELING MACHINE
[75] Inventor: Albertus van Raay, Ulft, Netherlands
[73] Assignee: Machinefabriek "Finis" B.V., Ulft, Netherlands
[21] Appl. No.: 790,250
[22] Filed: Apr. 25, 1977
[30] Foreign Application Priority Data
  Apr. 23, 1976 [NL] Netherlands ............ 7604310
[51] Int. Cl.² .............. A23N 7/02; A23N 15/08; A47J 17/18
[52] U.S. Cl. .................................. 99/631
[58] Field of Search .................. 99/630–633, 99/516, 525

[56] References Cited
U.S. PATENT DOCUMENTS

| 847,328 | 3/1907 | Franklin | 99/632 |
| 954,047 | 4/1910 | Powell | 99/631 |
| 3,001,561 | 9/1961 | Van Raay | 99/631 |
| 3,122,188 | 2/1964 | Curtis | 99/525 |

FOREIGN PATENT DOCUMENTS 301387  9/1954  Switzerland ................ 99/631

Primary Examiner—Harvey C. Hornsby
Assistant Examiner—Timothy F. Simone
Attorney, Agent, or Firm—Biebel, French & Nauman

[57] ABSTRACT

A peeling machine particularly for peeling tuburous vegetables such as potatoes and onions includes a vessel with side walls containing peeling mechanism and a rotatable bottom for tumbling the vegetables within the vessel against the peeling mechanism. Near the bottom, adjacent the center of the vessel and directed generally outward are one or more nozzles into which air under pressure is introduced. Near the top of the vessel located adjacent the side walls, are one or more spray nozzles through which water may be introduced. The introduction of air and/or water is selective, and can be adjusted according to the type of vegetable, and the amount thereof, being peeled in the machine.

2 Claims, 1 Drawing Figure

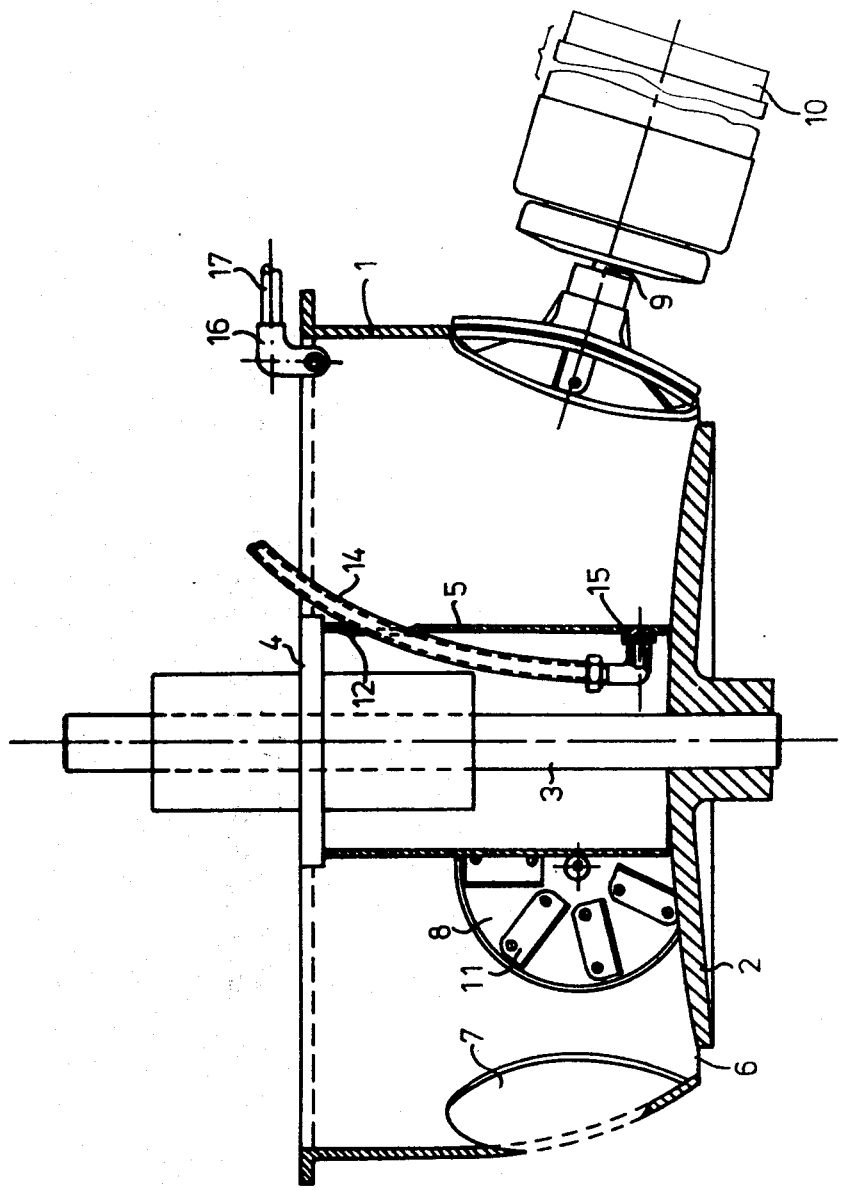

PEELING MACHINE

This invention relates to a peeling machine of the kind which comprises a vessel for containing tuberous plants to be peeled, for example potatoes or onions, mechanical means for moving the plants in the vessel and peeling means for mechanically loosening the peel from the tubers, said vessel having an outlet for conducting the peelings away.

Peeling machines of this kind have been employed for many years and operate satisfactorily.

According to the present invention, there is provided a peeling machine of the kind defined in which one or more spray-nozzles are provided for supplying pressurized fluid into the vessel.

It has been found rather surprisingly that in this way the throughput of the peeling machine can be more than doubled, since it appears that the fluid contributes to the peeling operation and to a rapid cleaning of the peeling means during the peeling operation.

Depending upon the products to be peeled, the fluid may be air and/or water. It has been found that even the keeping quality of the peeled products is materially improved, since they are worked within a very short period of time and with the aid of inert substances such as air or water apart from the mechanical peeling means.

In order that the invention may be readily understood, an embodiment thereof will now be described, by way of example, with reference to the accompanying drawing, the single FIGURE of which shows, partly in section and partly in elevation, a machine embodying the present invention.

A peeling machine comprises a cup-shaped vessel 1 having a bottom 2 fastened to a shaft 3. The shaft 3 is journalled in a bearing block 4, which is fastened to a sleeve 5 disposed in the vessel coaxially with the centre line of the vessel. The FIGURE shows that the bottom 2 is shaped so that the portion of the top surface of the bottom 2 located outside the sleeve 5 slopes down towards the inner wall of the vessel 1. Between the outer circumference of the bottom 2 and the lower edge of the inner wall of the vessel 1 a gap is provided for conducting away the peels of the products to be treated.

In the wall of the vessel there are provided circular openings 7 in which slightly dish-shaped plates 8 are arranged, such plates having a common tangential line with the lower edge of the vessel. The edges of the plates 8 located on the inner side of the vessel join the edges of the openings 7. The plates 8 are fastened to shafts 9 which are at least substantially normal to the openings 7 and are coupled with a driving member 10 for rotating the plates 8 during operation. The plates 8 have slots and cutters 11 disposed above the same.

Towards its top end the sleeve 5 has one or more openings 12 through which pass one or more conduits 14, each conduit 14 communicating wih a respective spray-nozzle 15 arranged near the lower end of the sleeve 5 at a short distance above the bottom 2 and opening out in the vessel. Pressurised air can be introduced into the vessel through the conduits 14.

Near the top of the vessel and near the circumference one or more water sprays 16 communicate with a water mains 17 for supplying water under pressure.

The tuberous plants to be peeled, for example onions or potatoes, are placed in the vessel, after which the bottom 2 as well as the cutters 11 on the discs 8 are caused to rotate. The rotating bottom 2 pushes the tubers towards the upright wall of the vessel 1, where the peels are removed from the tubers by the cutters 11.

In order to enhance the peeling operation a pressurised fluid, i.e. water through the spray-nozzle 16 and/or air through the nozzles 15 can be introduced into the vessel. For peeling onions it will be preferred to supply pressurised air, whereas for peeling potatoes water under pressure can be supplied. When a plurality of nozzles are used for water and/or air, steps can be taken to enable selection of the simultaneous operation of a greater or smaller number of nozzles. Of course, it is also possible to introduce simultaneously pressurised water and air into the vessel.

It has been found that the introduction of such a pressurised fluid can provide an appreciable improvement in the peeling effect.

It should be noted that instead of using the mechanical peeling means formed by the rotating cutters, other mechanical peeling means, for example, carborundum parts may be employed.

What we claim is:

1. A machine for peeling vegetable tubers such as potatoes and onions, comprising
   a vessel having side walls including peeling means for removing peelings from vegetables tumbled about in said vessel,
   said peeling means including at least one rotary peeling cutter mounted in said side walls,
   a rotatable bottom in said vessel operable to tumble the vegetables against said peeling means,
   at least one nozzle supported near the center and bottom of said vessel and directed outward toward said side walls,
   means supplying air under pressure to said nozzle to direct a flow of air outward through the vegetables being peeled,
   at least one spray nozzle supported near the top and adjacent said side wall of said vessel, and
   means supplying water to said spray nozzle.

2. A peeling machine as defined in claim 1, including means for selectively actuating said air supply and said water supply.

* * * * *